(12) United States Patent
Sesko

(10) Patent No.: US 7,333,214 B2
(45) Date of Patent: Feb. 19, 2008

(54) DETECTOR FOR INTERFEROMETRIC DISTANCE MEASUREMENT

(75) Inventor: David William Sesko, Woodinville, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 173 days.

(21) Appl. No.: 11/396,368

(22) Filed: Mar. 31, 2006

(65) Prior Publication Data
US 2007/0229843 A1  Oct. 4, 2007

(51) Int. Cl.
*G01B 11/02* (2006.01)

(52) U.S. Cl. ...................................... 356/493

(58) Field of Classification Search ........ 356/491–493, 356/487
See application file for complete search history.

(56) References Cited

U.S. PATENT DOCUMENTS

| | | | |
|---|---|---|---|
| 4,105,335 A | 8/1978 | Tanaka et al. | |
| 5,018,862 A | 5/1991 | Aiello | |
| 6,452,682 B2 * | 9/2002 | Hill et al. | 356/493 |
| 6,906,315 B2 | 6/2005 | Tobiason | |
| 2001/0028461 A1 * | 10/2001 | Hill et al. | 356/493 |
| 2007/0115483 A1 * | 5/2007 | Oak et al. | 356/600 |

OTHER PUBLICATIONS

Kriehn, G.R., "Coherent Optical Signal Processing for Broadband Adaptive Phased-Array Antennas Using the BEAMTAP Algorithm," doctoral dissertation, University of Colorado, Dept. of Electrical and Computer Engineering, Boulder, Colorado, 2003.

* cited by examiner

*Primary Examiner*—Patrick Connolly
(74) *Attorney, Agent, or Firm*—Christensen O'Connor Johnson Kindness PLLC

(57) ABSTRACT

A detector for interferometric distance or displacement measurement. The detector may receive orthogonally polarized object and reference path output beams, which are directed to a polarization-sensitive beam deflecting element. The beam deflecting element deflects one or both orthogonally polarized beams to provide a desired divergence angle between the beams. The diverging beams are input to a mixing polarizer. The beams exiting the mixing polarizer are similarly polarized and therefore interfere. The interfering diverging beams form interference fringes. The spatial phase of the fringes relative to a photodetector array characterizes the phase difference between the object and reference beams of the interferometer.

16 Claims, 6 Drawing Sheets

DETECTOR FOR INTERFEROMETRIC DISTANCE MEASUREMENT

FIELD OF THE INVENTION

This invention is directed to detectors for interferometric distance and displacement measuring devices.

BACKGROUND OF THE INVENTION

Laser interferometers are widely used to measure distances or displacements. One type, polarization interferometers, operate by projecting a coherent beam to a polarizing beamsplitter arranged to provide two coherent orthogonally polarized beams. One of the orthogonally polarized beams is projected along the fixed-length reference path of the interferometer and one along the distance-measuring object or sample path. The beams are directed through respective quarter wave plates, and reflected from the reference surface and the sample surface, respectively. The reflected beams return through the quarter wave plates and are recombined at the same polarizing beamsplitter, to form an output beam having two orthogonally polarized components. The desired distance or displacement measuring information is carried by the phase difference between the orthogonally polarized components of the output beam.

Numerous schemes have been devised for measuring this phase difference. In one common scheme, a quadrature detector is used. Various types of quadrature detectors are known. Such quadrature detectors typically include multiple beam paths, beamsplitters, waveplates, polarizers, and multiple detectors. Differences between the components and alignment of the multiple beam paths contribute to differential phase and amplitude errors and/or environmental sensitivity and changes over time in the resulting quadrature signals. The errors associated with these differences may be small, and they are frequently overlooked or ignored. Thus, the accuracy of the resulting phase measurement may be limited by the quadrature detector errors. The present invention is directed to providing an apparatus that overcomes the foregoing and other disadvantages.

SUMMARY OF THE INVENTION

As previously indicated, the resolution and/or accuracy of a polarization interferometer is often limited by the ability of the phase difference detector, also referred to simply as a detector herein, to generate one or more measurement signals which are truly related only to the phase difference between the object beam and reference beam outputs. The present invention is directed to a polarization interferometer phase difference detector which uses a novel configuration of components to advance the achievable phase difference measurement accuracy. It should be appreciated that phase difference measurement is already a refined art, and that even small improvements are valued for extending the accuracy and/or reliability of the most accurate measurement technology that is widely available (interferometry). The phase difference measurement is ultimately used to provide a measuring resolution and/or accuracy finer than the basic wavelength of radiation used in the interferometer. For this reason, the degree of meaningful measurement resolution supported by a detector is sometimes referred to as the "interpolation level". Interpolation levels on the order of $1/100$ of a wavelength are not uncommon. A detector according to this invention may provide meaningful interpolation well beyond this level, on the order of $1/1000$ of a wavelength, and/or provide improved reliability, and reduced sensitivity to aging and environmental variables.

According to one aspect of the invention, the orthogonally polarized object and reference beam components of the output beam are directed to a polarization-sensitive beam deflecting element, which deflects one or both of the orthogonally polarized beams to provide a desired divergence angle between the between the beams. The diverging beams are input to a mixing polarizer, such that the beams exiting the mixing polarizer are similarly polarized and therefore interfere. The interfering diverging beams will then form interference fringes, which may be parallel fringes. The spatial phase of the fringes relative to the detector characterizes the phase difference between the object and reference beams of the interferometer.

According to one aspect of the invention, the polarization-sensitive beam deflecting element may be a polarization-sensitive prism, such as a Rochon prism, a Wollaston prism, or a Senarmont prism, for example. Such a prism may deflect one or both of the polarized beams in a particularly stable manner. According to a further aspect of the invention, the polarization-sensitive prism may be a monolithic element.

According to another aspect of the invention, the mixing polarizer may be a rigid planar polarizer mounted proximate to an output surface of the polarization-sensitive beam deflecting element, in order to reduce or minimize the intervening optical path. According to a further aspect of the invention, the polarizer may abut the output surface of the polarization-sensitive beam deflecting element.

According to another aspect of the invention, the spatial phase of the fringes relative to the detector may be sensed by a photodetector array configured to spatially filter the fringe pattern to provide a plurality signals that differ by an intentionally introduced phase shift of (360/N) degrees, where N is an integer that is at least 3. In various embodiments the photodetector array may be periodic and the center-to-center spacing (pitch) between the individual photodetectors may be a fraction of the fringe spacing at the surface of the array. In various embodiments the fringe spacing at the surface of the array may be an integer number times the pitch of the photodetector array.

According to another aspect of the invention, a mounting angle of the photodetector array may be adjusted to bring the fringe spacing at the surface of the array to a desired relationship with the pitch of the photodetector array.

According to another aspect of the invention, the photodetector array may be mounted proximate to an output surface of the polarizer, in order to reduce or minimize the intervening optical path. According to a further aspect of the invention, the photodetector array may be bonded to the output surface of the polarizer.

According to another aspect of the invention, the photodetector array may spatially filter the fringe pattern to provide 3-phase output signals that may undergo signal processing to remove certain errors when determining the spatial phase of the fringes.

According to another aspect of the invention, the photodetector array may spatially filter the fringe pattern to provide quadrature output signals that may undergo signal processing to remove certain errors when determining the spatial phase of the fringes.

According to another aspect of the invention, the polarization-sensitive beam deflecting element, the mixing polarizer and the photodetector array may be assembled together in a compact monolithic detector configuration.

According to another aspect of the invention, the polarization-sensitive beam deflecting element, the mixing polarizer and the photodetector array may be assembled together in a detector configuration that provides only a single common path shared by the interfering reference and object beams throughout the detector, and all signal-generating photodetector elements of the detector are positioned in that single common path.

In accordance with another aspect of the invention, an interferometric distance or displacement sensing device is operated in the following manner. Initially, first and second light beams are created from a source beam, such that the first and second beams are orthogonally polarized. The first beam is input along a reference path of the interferometer and the second beam is input along an object path of the interferometer. The first beam is output from the reference path and the second beam is output from the object path such that the first and second beams are orthogonally polarized, nominally parallel, and overlapping to form a combined output beam. The combined output beam is input into a polarization-sensitive beam deflecting element that has first and second polarization-sensitive axes that are respectively aligned parallel to the polarization directions of the first and second beams of the combined output beam. The first and second beams are output from the polarization-sensitive beam deflecting element with a divergence angle between the beams that is approximately a predetermined nominal divergence angle, and such that the first and second beams are partially overlapping. The partially overlapping first and second beams are transmitted through a polarizer having a polarization angle that nominally bisects the angle between the polarizations of the first and second beams, and the transmitted polarization components of the first and second beams form an interference fringe pattern of nominally parallel fringes characterized by a constant fringe pitch and a variable spatial phase that depends on, a variable path length difference between the reference and object paths. The spatial phase of the interference fringe pattern is detected using a photodetector array, wherein the photodetector array is configured to spatially filter the fringe pattern to provide a plurality of signals that differ by an intentionally introduced phase shift of (360/N) degrees, where N is an integer that is at least 3.

In accordance with another aspect of the invention, a detector is provided that may be used in conjunction with a two wavelength absolute interferometer. In such a case, phase differences are to be determined for each of two discrete wavelengths that pass through an interferometer along a common path. In a first dual-wavelength embodiment a beamsplitter is positioned somewhere downstream from the polarization-sensitive beam deflecting element, to provide two separate optical paths in the dual-wavelength detector. A fringe pattern is created in each of the two optical paths. Wavelength-selective optical filters are be used to isolate a different wavelength in each interference fringe pattern. The spatial phase of each respective fringe pattern may be detected by respective photodetector arrays, with each photodetector array configured according to previously outlined principles, to match the fringe pattern of the wavelength that is transmitted through its respective filter.

In variations of this embodiment, a mixing polarizer may precede a non-polarizing beamsplitter along the optical path, or two separate mixing polarizers may be positioned after the beamsplitter and before the photodetector arrays along their respective optical paths. In another variation that is advantageous in terms of simplicity and optical signal strength, a polarizing beamsplitter may be used as the mixing polarizer, and no other polarizers are required in the dual-wavelength detector.

In another dual wavelength embodiment, no beamsplitter is required. Instead, the detector configuration is the same as a previously outlined single-wavelength configuration, except the beam diameters and/or the photodetector dimensions are configured such that two different photodetector arrays may be positioned in the single interference pattern output from the mixing polarizer. Wavelength-selective filters are positioned in front of each of the photodetector arrays. Each respective photodetector array is configured according to previously outlined principles, to match the fringe pattern of the wavelength that is transmitted through its respective filter and detect its spatial phase.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

It should be understood that in various figures, illustrated component dimensions and spacings are selected for illustration clarity. Different parts of a figure may be drawn to different drawing scales, depending on various details to be emphasized. Such discrepancies should be apparent to one skilled in the art. Desirable and practical device configurations will be understood based upon the entirety of this disclosure.

Figure 1A:
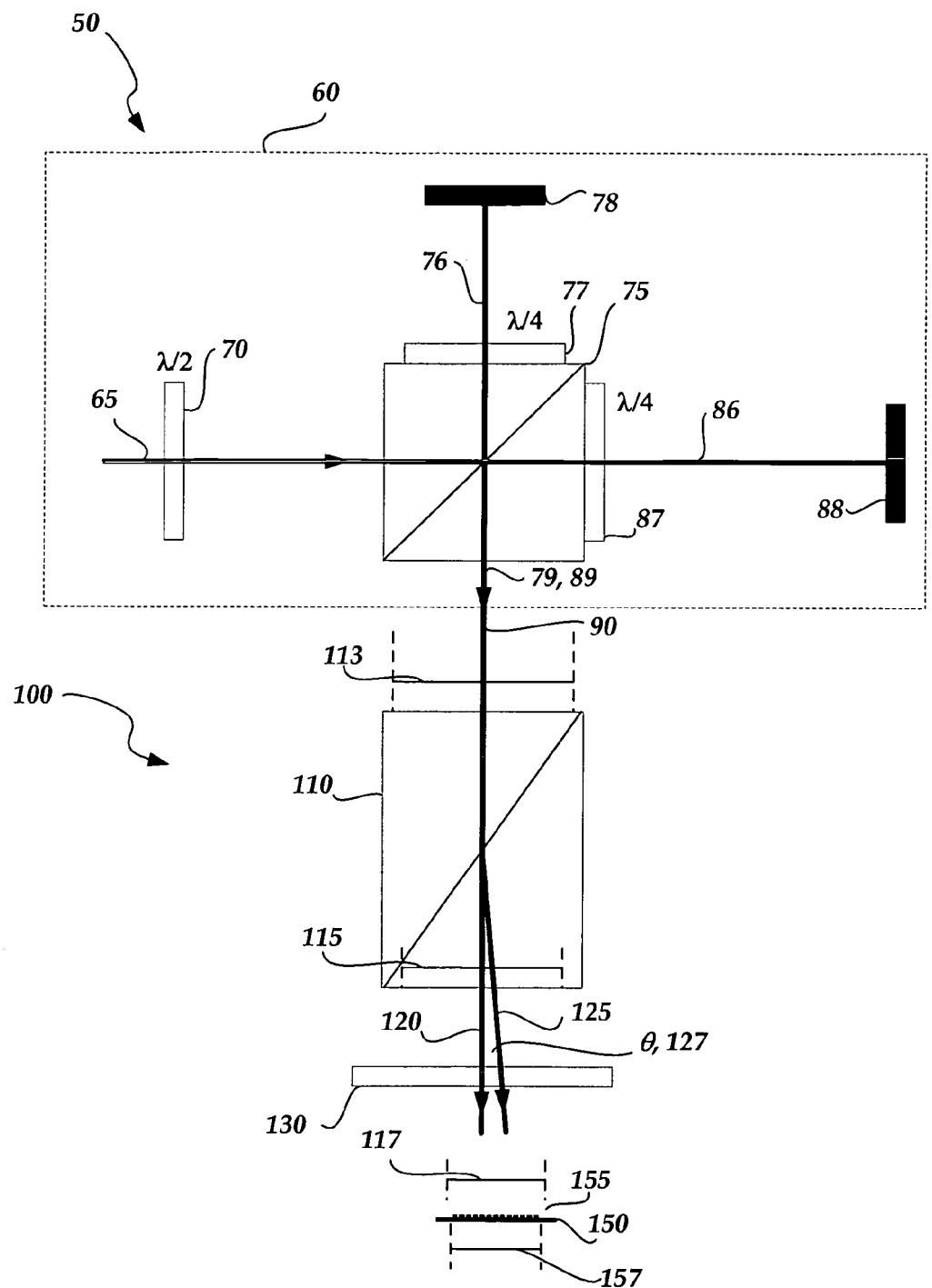
FIG. 1A is a diagram of an exemplary interferometric distance measuring apparatus, including an interferometer portion and a schematic representation of a first exemplary detector according to this invention.

FIG. 1A shows an exemplary interferometric distance measuring apparatus 50, including an interferometer portion 60 and a detector 100. In the interferometer portion 60, a laser source (not shown) may be used to generate coherent radiation 65. The radiation 65 passes through a half-wave plate 70 and is then incident on a polarizing beam splitter 75, which transmits the portion of the radiation 65 that is "P" polarized to form reference beam 86, and reflects the portion of the radiation which is "S" polarized to form object beam 76. The reference beam 86 is transmitted through a quarter wave plate 87 to a fixed reference mirror 88 and reflected back through the quarter wave plate 87 to reach the polarizing beam splitter 75. Its direction of polarization is now rotated 90° relative to its initial transmission through the polarizing beamsplitter 75. Thus, it is reflected by the polarizing beam splitter 75 to form the output reference beam 89, which is one orthogonally polarized component of a combined beam 90.

Similarly, object beam 76 is transmitted through a quarter wave plate 77 and reflected from the movable object surface 78 back through the quarter wave plate 77 to reach the polarizing beam splitter 75. Its direction of polarization is now rotated 90° relative its initial reflection from the beamsplitter 75. Thus, it is transmitted to form the output object beam 79, which is the other orthogonally polarized component of the combined beam 90.

The detector 100 is shown schematically in FIG. 1A. The detector 100 includes a polarization-sensitive beam deflecting element (PSBDE) 110, a mixing polarizer 130 and a photodetector circuit 150. As described in greater detail below, the combined beam 90, which has an input cross-section dimension 113, is input to the PSBDE 110, which is properly oriented to separate the orthogonally polarized components of the beam 90 by a divergence angle θ. In the embodiment illustrated in FIG. 1A, the PSBDE 110 is a Rochon prism, which transmits an undeflected beam 120 and a deflected beam 125 that is deflected by an angle 127. In this particular case, the divergence angle θ is the same as the deflection angle 127. A properly designed and oriented Senarmont prism may function similarly as a PSBDE. In another case, a PSBDE may be of a "dual-deflection" type that deflects both beams by respective deflection angles, and the divergence angle θ may be the sum of the two respective deflection angles. The dual-deflection type of PSBDE may comprise by Wollaston prism or a properly structured binary dielectric grating, such as that described in the article "Wollaston prism-like devices based on blazed dielectric subwavelength gratings", by Haidar et. al., Optics Express, December 2005, Vol. 13, No. 25.

The diverging orthogonally polarized beams then pass through the mixing polarizer 130, which is oriented to provide a polarization angle that is nominally halfway between the polarization angles of the orthogonally polarized beams 120 and 125. The components of the diverging beams 120 and 125 that are transmitted by the mixing polarizer 130 are similarly polarized and therefore form an interference pattern of nominally parallel fringes. The spatial phase of the fringes relative to the detector characterizes the phase difference between the object and reference beams of the interferometer. The fringe pattern falls on photodetector array 155 of the photodetector circuit 150. The photodetector array 155 is configured to provide signals that may be analyzed to determine the spatial phase of the fringes relative to the detector, as described in greater detail below. In general, any now-known or later-developed configuration of photodetectors may be used if it provides such signals.

The interference fringe pattern may have a dimension 115 at the exit surface of the PSBDE 110, which is the dimension of the overlapping region of the beams 120 and 125. It will be appreciated that as the beams propagate and diverge, the overlapping region becomes smaller, having a dimension 117 at the photodetector array 155. It is advantageous if the detector is designed such that the dimension 117 is larger than a dimension 157 of the photodetector array 155. In this case, the fringe pattern covers the entire photodetector array 155, and produces the strongest and best-matched signals. In various embodiments a compact detector 100 may be designed and assembled such that the photodetector array 155 is proximate to the mixing polarizer 130, which is proximate to the exit surface of the PSBDE 110. In one embodiment, these elements may be bonded together to form a stable monolithic assembly. In some embodiments, these elements may be assembled to abut one another.

Figure 1B:
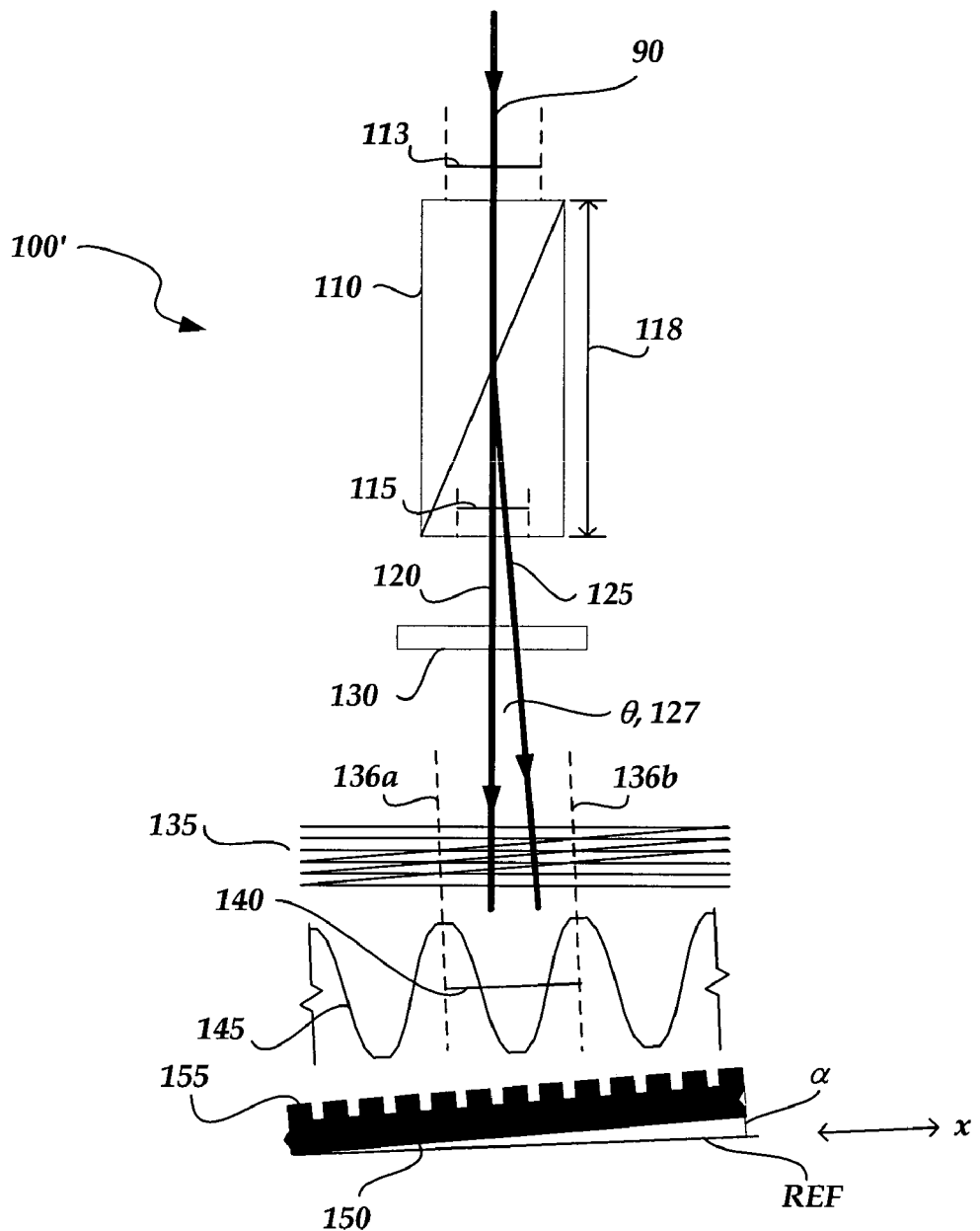
FIG. 1B is a schematic diagram of the first exemplary detector of FIG. 1A, showing aspects of its operation in greater detail.

FIG. 1B is a diagram of a detector 100' which may be similar or identical to the detector 100 shown in FIG. 1A. However, the scale of the drawing elements 135, 145 and 155 is greatly exaggerated for clarity. FIG. 1B shows a set of wavefronts 135 of the interfering diverging beams 120 and 125. The dashed lines 136A and 136B mark parallel planes of equal intensity in the fringe pattern. The planes extend along a direction in and out of the page. A fringe intensity signal 145, schematically represents a sinusoidal or near-sinusoidal intensity distribution that has a spatial period 140. A reference plane REF extends in and out of the page. The plane REF is perpendicular to the parallel planes 136A and 136B and normal to a line that bisects the angle θ between the interfering beams 120 and 125. The photodetector array 155 forms a detection plane that extends in and out of the page and is arranged at an angle α relative to the plane REF, as described below. If the intensities of the object and reference beams 120 and 125 are matched, the interference fringe pattern will be generated with a signal amplitude:

$$S(x, l_S) = 2I_0 \left[ 1 + \cos\left( \frac{2\pi}{\lambda} \left( 2l_S - 2l_R - (x - x_0) 2\sin\left(\frac{\theta}{2}\right) \right) + \phi_0 \right) \right] \quad \text{(Eq. 1)}$$

where λ is the wavelength of the light, $l_S$ is the optical path length of the interferometer object arm, $l_R$ is the optical path length of the interferometer reference arm, x is the position along a direction perpendicular to the parallel planes 136A and 136B (that is, parallel to the plane REF), $x_0$ is a spatial offset, and $\phi_o$ is the accumulated phase difference offset of all of the optical components along each of the beam paths through the interferometer, and including the different phase velocities of the ordinary and extraordinary beams within the Rochon polarizer.

The pitch or spatial period $P_\theta$ of the interference fringe pattern is related to the divergence angle θ and the wavelength of light λ by:

$$P_\theta = \frac{\lambda}{2\sin(\theta/2)} \quad \text{(Eq. 2)}$$

In one specific example embodiment, a Rochon quartz crystal polarizer may be designed to provide θ=1.159° at a wavelength of 780 nm, which would give a fringe pitch $P_\theta$=38.6 microns. More generally a divergence angle selected in the range of 0.5 degrees to 4.5 degrees may be advantageous in combination with various practical photodetector arrays.

In various embodiments, the photodetector array 155 may be arranged to provide N "spatial phase signals" corresponding to M*fringe pitch, where N is an integer greater than one. In general, with M as an integer greater than zero, a group of N photodetectors may be distributed at regular intervals over a span of $M*P_\theta$ (or slightly more, as described below) in order to provide such a set of signals. The center-to-center spacing of individual photodetectors may be designated as the photodetector array pitch Pd. In various embodiments, proceeding sequentially along the measurement direction, the N photodetectors may provide N phase-shifted signals that are intentionally phase shifted relative one another by increments of (M*360/N) degrees. As a practical measure, to allow for practical fabrication and assembly tolerances, divergence angle tolerance, and the like, the detector array 155 may be fabricated such that $N*P_d$ is slightly larger than $M*P_\theta$. Then, during assembly or calibration, the detector array 155 may be intentionally tilted by an angle α relative to the plane REF such that:

$$\cos\alpha = \frac{M \cdot P_\theta}{N \cdot P_d} \quad \text{(Eq. 3)}$$

Figure 2:
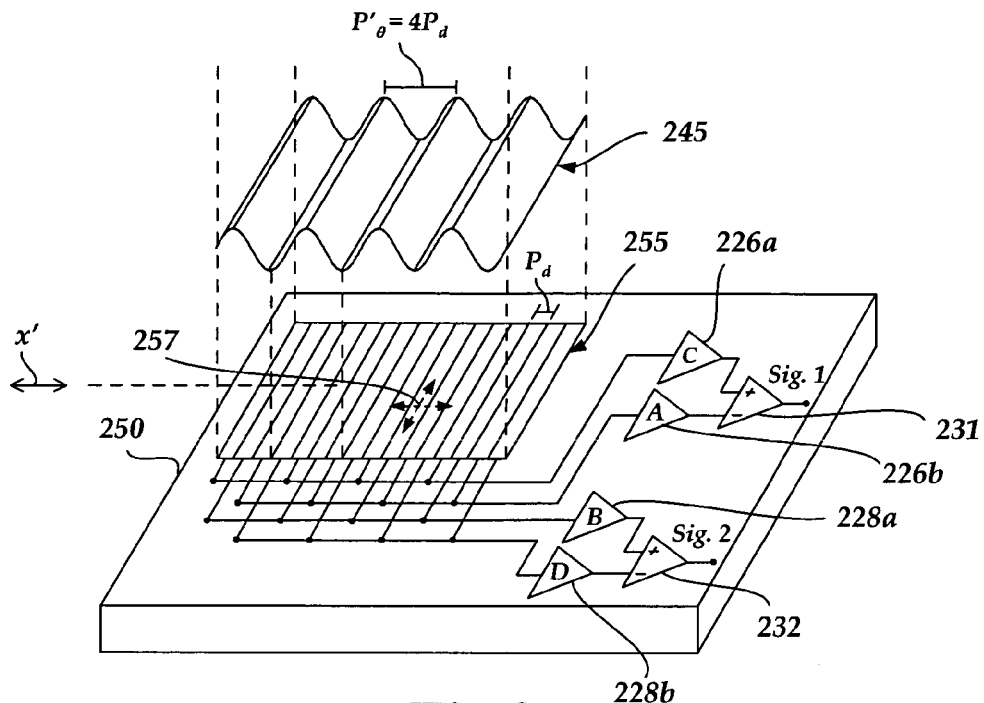
FIG. 2 is a diagram of a partially schematic isometric view of one exemplary embodiment of a photodetector array circuit that includes one exemplary embodiment of a photodetector array configuration usable in a detector according to this invention.

FIG. 2 is a schematic isometric view of one exemplary embodiment of a photodetector circuit 250 that includes one exemplary embodiment of a photodetector array 255. The number of photodetectors shown in the photodetector array 255 is artificially reduced for illustration clarity. In general, it is advantageous for increasing the signal strength and averaging out certain errors, to provide a large number of photodetectors. For example, it may be desirable to include Q*M*N photodetectors, where Q is an integer that is at least 3, and preferably at least 6.

A fringe intensity profile 245 is shown. The pitch P'θ is the fringe pitch observed on a detection plane 257 of the photodetector array 255. To be consistent with the discussion of FIG. 1B and EQUATION 3, P'θ=(Pθ/cosα), and x'=(x/cosα). In this particular example, the photodetector circuit 250 is arranged to provide 4 phase-shifted signals (N=4) that are intentionally phase shifted relative one another over 1 fringe pitch (M=1) by increments of M*360/N degrees=90°. The individual photodetectors are arranged with a photodetector array pitch Pd. In this example P'θ=4Pd, and each individual photodetector element is electrically connected with (or otherwise summed with) the individual photodetector elements located 4Pd away from it, to form four respective photodetector sets, A (0°), D (270°), C (180°) and B (90°). Other exemplary detector configurations are described further below.

The fringe intensity profile 245 is shown at one exemplary position along the detector measuring axis X'. As the object path length changes by an arbitrary amount $\Delta l_S$, the phase difference between the interfering beams 120 and 125 undergoes a change of 360°(2$\Delta l_S$/λ). Accordingly, the fringe intensity profile 245, following the fringes, moves along the measuring axis X', changing its spatial phase by 360°(2$\Delta l_S$/λ) relative to any given point on the fixed detector array 255. The four respective photodetector sets spatially filter the fringe intensity profile 245. Thus, each one of the photodetector sets receives an optical signal that varies periodically as a function of the changing spatial phase of the fringe pattern on the detection plane 257.

The 4-phase photodetector circuit 250 illustrated in FIG. 2 is a simplified schematic representative of various known photodetector circuit configurations that produce quadrature type signals. Therefore, it need not be described in detail. Briefly, the photodetector sets A-D receive an optical signal that varies sinusoidally according to the spatial phase of the fringe intensity profile 245. The respective photodetector sets A-D output electrical signals proportional to the optical signals: signal A (0°="reference" phase) to amplifier 226a, signal B (90° relative phase shift) to amplifier 228a, signal C (180° relative phase shift) to amplifier 226b, and signal D (270° relative phase shift) to amplifier 228b. The signals A and C from amplifiers 226a and 226b are combined via a differential amplifier 231 to produce signal 1 (Sig. 1), while the signals B and D from amplifiers 228a and 228b are combined via a differential amplifier 232 to produce signal 2 (Sig. 2). The differential signals (A-C) and (B-D) reduce or eliminate common-mode "DC offset" errors present in the optical and electrical signals A-D. Signal 1 (Sig. 1) and signal 2 (Sig. 2) are approximately sinusoidal signals that are out of phase by 90 degrees (that is, they are quadrature signals).

Figure 3:
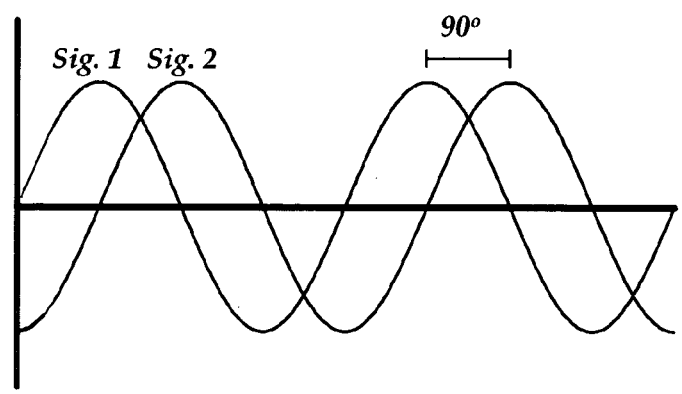
FIG. 3 is a diagram illustrating the general characteristics of the output signals provided by the photodetector array circuit of FIG. 2 as the spatial phase of the detected fringe pattern varies.

FIG. 3 shows the general characteristics of the output signals 1 and 2 (Sig. 1 and Sig. 2) as a function of displacement in the interferometer and/or the resulting change in the phase difference of the interfering beams 120 and 125 and/or the resulting change in the spatial phase of the fringe intensity profile 245. The processing of such quadrature signals for determining displacement is a standard process known to one of ordinary skill in the art and therefore need not be described in detail. However, a brief discussion of one exemplary method is outlined below with reference to quadrature signal values Sig. 1 and Sig. 2.

Sig. 1 and Sig. 2 behave as sine and cosine signals. Accordingly, the spatial phase of the fringe intensity profile 245 is indicated by arctan (Sig.1/Sig.2), with an ambiguity of 180°. The ambiguity may be eliminated by examining the signs of the signals. Alternatively, Sig. 1 and Sig. 2 can be processed using a two-argument arctangent function that is modulo 2π:

spatial phase φ=atan 2(Sig. 1, Sig. 2) (Eq. 4)

The two-argument "a tan2" function shown in EQUATION 4 is available and described in a number of publicly available mathematical programs. The function's result is the arctangent of Sig. 1/Sig. 2, in radians. However, the use of two arguments allows the determination of the quadrant of the resulting angle, so that the result is between −pi and +pi rather than −pi/2 and +pi/2.

Alternatively to using a 4-phase detector array, as described above, a 3-phase detector array may be used. In the case of a 3-phase design, in one embodiment, the photodetector circuit may be arranged to provide 3 phase-shifted signals (N=3) that are intentionally phase shifted relative one another by increments of (360°/N)=120°. The individual photodetectors may be such that P'θ=3Pd. Each individual photodetector element is electrically connected with (or otherwise summed with) the individual photodetector elements located P'θ=3Pd away from it, to form three respective photodetector sets, A' (0°), B' (120°) and C' (240°), that output three-phase signals indicative of the fringe pattern position or spatial phase. A specific example of methods for connecting and processing three-phase position signals is described in U.S. Pat. No. 6,906,315, which is hereby incorporated by reference in its entirety. In particular, three-phase optical intensity signals can be processed by the exemplary method described in the '315 patent to determine two derived quadrature signal values that may then be analyzed in the same manner as Sig. 1 and Sig. 2, to determine the fringe pattern position or spatial phase.

More generally, any practical number of phases signals (N phase signals) may be provided by a photodetector array and used with suitable signal processing and analysis. It is not necessary that all phase signals are derived from a single period of the fringe intensity profile 245. To provide one illustrative example, the photodetector circuit may be arranged to provide 4 phase-shifted signals (N=4) over an interval 3*P'θ (M=3), where in this case P'θ is a nominal design value associated with a nominal value of the angle α. Thus, in this example, the photodetector array pitch Pd=(3P'θ/4), and spatially sequential photodetectors are intentionally phase shifted relative one another by increments of (M*360°/N)=(3*360°/4)=270°. This particular M/N ratio is representative of a group of ratios that may be used to eliminate certain periodic errors that occur as a spatial second harmonic of the basic signal. The width of the photodetectors in the array may be adjusted to maximize the signal and/or filter out other spatial harmonics, if desired. Each individual photodetector element is electrically connected with (or otherwise summed with) the individual photodetector elements located 4Pd away from it, to form 4 respective photodetector sets, A" (0°), D" (270°), C" (180°) and B" (90°general, it is advantageous if a photodetector array satisfies the conditions: M*P'θ=N*Pd, N>M, and Q*M*N photodetectors are arranged to receive the fringe pattern, where M, N and Q are integers. One of the combinations (M=1, N=3), (M=1, N=4), (M=2, N=3), and (M=3, N=4) may be the most practical, depending on various fabrication constraints. In any case, by analyzing a plurality of respective signals arising from various photodetector elements at various respective phase positions within the interference fringe pattern, it is possible to eliminate certain common-mode errors in the optical signals and determine and compensate certain other errors, and the like. If all photodetectors used to detect the various phase signals are located on a single IC, certain errors that otherwise arise due to the differences between separate photodetector circuits may also be eliminated as common-mode errors.

Figure 4:
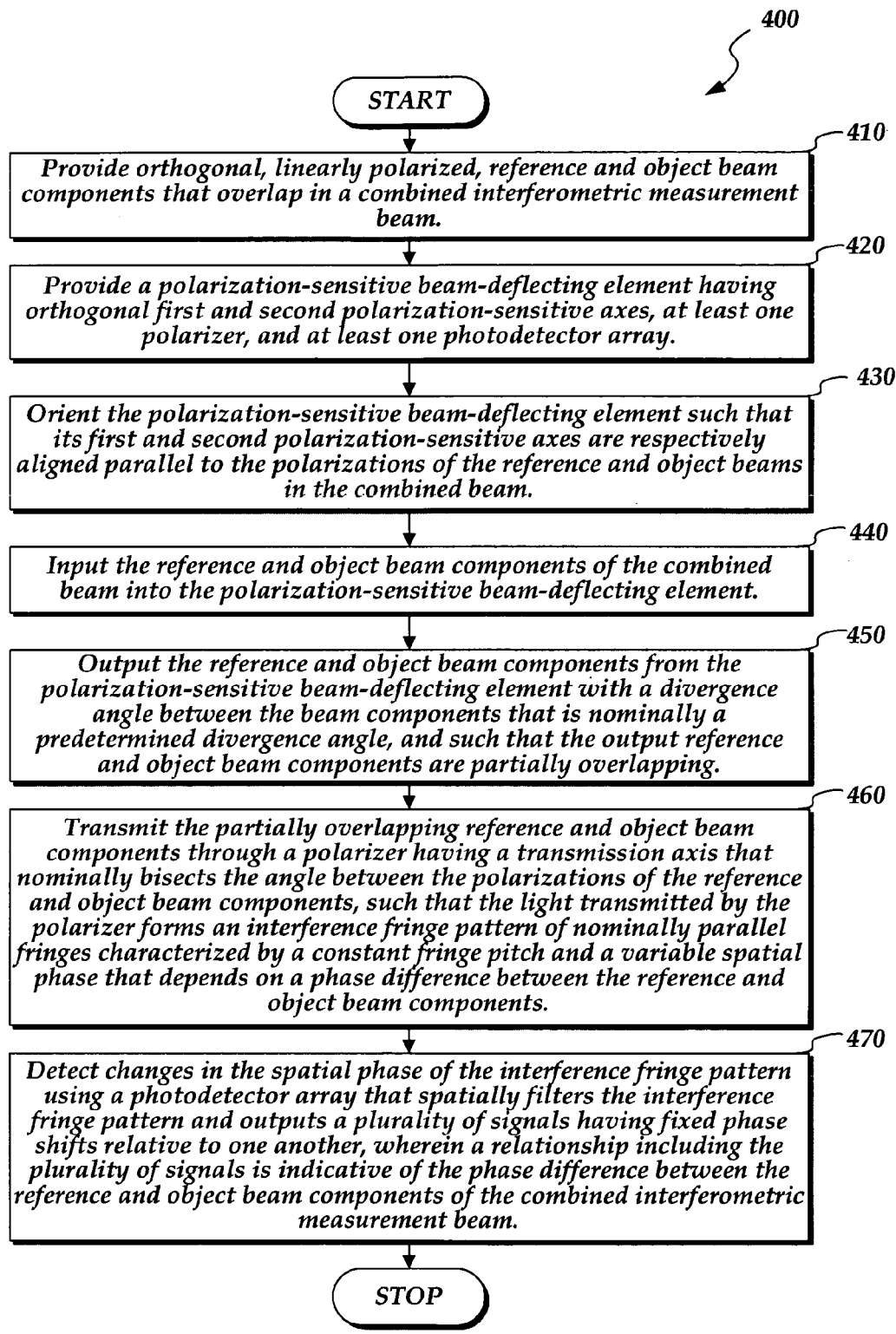
FIG. 4 is a flow diagram illustrating one exemplary embodiment of a routine for performing operations usable to determine a value indicative of the phase difference between coherent orthogonally polarized first and second beams in a combined beam, using a detector according to this invention.

FIG. 4 is a flow diagram illustrating one exemplary embodiment of a routine 400 for performing operations usable to determine a value indicative of the phase difference between coherent orthogonally polarized first and second beams in a combined beam, using a detector according to this invention. As shown at a block 410, orthogonal, linearly polarized, reference and object beam components are provided, that overlap in a combined interferometric measurement beam. For example, such a combined beam may be obtained as the output from a polarization interferometer of a now-known or later-developed configuration. At a block 420, a polarization-sensitive beam-deflecting element is provided, having orthogonal first and second polarization-sensitive axes, at least one polarizer, and at least one photodetector array. At a block 430, the polarization-sensitive beam-deflecting element is oriented such that its first and second polarization-sensitive axes are respectively aligned parallel to the polarizations of the reference and object beams in the combined beam.

At a block 440, the reference and object beam components of the combined beam are input into the polarization-sensitive beam-deflecting element. At a block 450, the reference and object beam components from the polarization-sensitive beam-deflecting element are output with a divergence angle between the beam components that is nominally a predetermined divergence angle, and such that the output reference and object beam components are partially overlapping. At a block 460, the partially overlapping reference and object beam components are transmitted through a polarizer having a transmission axis that nominally bisects the angle between the polarizations of the reference and object beam components, such that the light transmitted by the polarizer forms an interference fringe pattern of nominally parallel fringes characterized by a constant fringe pitch and a variable spatial phase that depends on a phase difference between the reference and object beam components. At a block 470, changes in the spatial phase of the interference fringe pattern are detected using a photodetector array that spatially filters the interference fringe pattern and outputs a plurality of signals having fixed phase shifts relative to one another, wherein a relationship including the plurality of signals is indicative of the phase difference between the reference and object beam components of the combined interferometric measurement beam.

Figure 5:
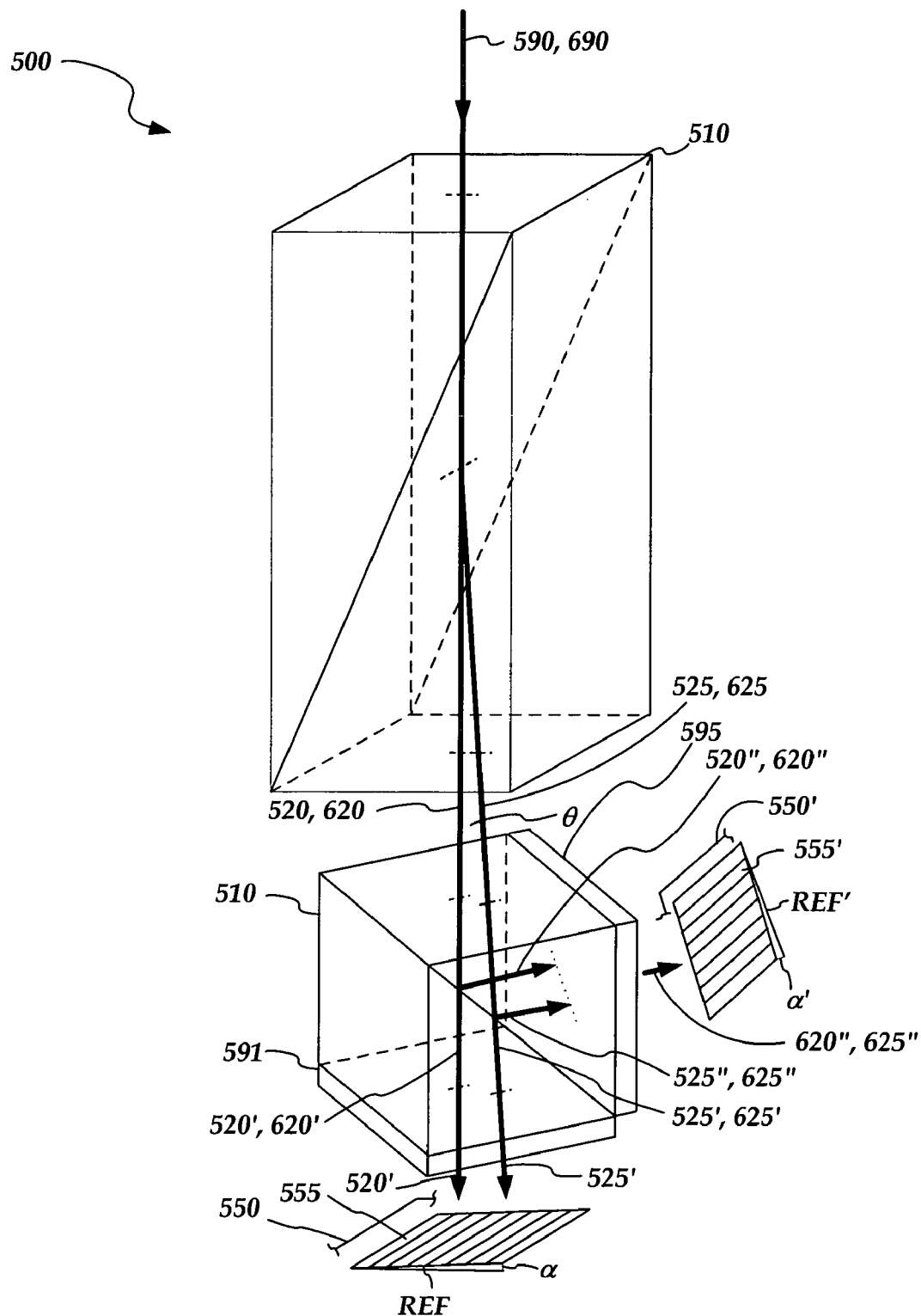
FIG. 5 is a diagram of a first exemplary dual-wavelength detector, including a beamsplitter for splitting the beams exiting a polarization-sensitive beam-deflecting element and two separate photodetector arrays.

FIG. 5 illustrates a first exemplary dual-wavelength detector 500. Such a detector may be used, for example, in conjunction with a two wavelength, absolute, polarization interferometer. In such a case, two respective phase differences are to be determined for two respective wavelengths of radiation λ and λ' that pass through the interferometer along a common path.

The detector 500 is shown schematically in FIG. 5. The elements referred to by the reference designations 590 and 690, 510, 520 and 620, 525 and 625, θ, 550 and 550', 555 and 555', REF and REF', α and α', may be designed, configured and operated in a manner analogous, or identical, to that previously described for the elements referred to by the reference designations 90, 110, 120, 125, θ, 150, 155, REF and α, respectively, with reference to FIGS. 1A and 1B. It should be understood that each of the beams 590, 520, and 525 comprise the same beam components as the beams 90, 120 and 125 of FIGS. 1A and 1B, as obtained with the use of a first wavelength λ of radiation. However, it should also be understood that the beams 690, 620, and 625 comprise duplicates of those beam components obtained with the use of a second wavelength λ' of radiation. These will be referred as the first wavelength components and the second wavelength components. The second wavelength components 620, and 625 have the same polarizations as their first wavelength counterparts 520, and 525. They may also be nominally collinear with their counterparts, until they are separated at wavelength sensitive filters 591 and 595, as described below.

By analogy with the description of FIG. 1A, the structure of the orthogonally polarized beam pairs 520 and 525, 620 and 625, will be understood as they exit the PSBDE 510. These beams enter a polarizing beamsplitter 575 which has a polarization angle that is nominally halfway between the polarization angles of the orthogonally polarized beam pairs 520 and 525, 620 and 625. The first-wavelength components 520' and 525' that are transmitted by the polarizing beamsplitter 575 are similarly polarized, as are the second-wavelength components 620' and 625'. Therefore, they interfere to form a first-wavelength interference pattern and a second-wavelength interference pattern that are superimposed. A wavelength-sensitive filter 591 filters out the second-wavelength radiation and only the first-wavelength fringe pattern reaches the photodetector array 555. The photodetector array 555 is configured and angled to provide signals that may be analyzed to determine the spatial phase of the first-wavelength fringes, according to previously described principles. Thus, the phase difference between the first-wavelength reference and object beams may be determined.

Similarly, the first-wavelength components 520" and 525" that are reflected by the polarizing beamsplitter 575 are similarly polarized, as are the second-wavelength components 620" and 625". They interfere to form first- and second-wavelength interference patterns that are superimposed. A wavelength-sensitive filter 595 filters out the first-wavelength radiation and only the second-wavelength fringe pattern reaches the photodetector array 555'. The photodetector array 555' is configured and angled to provide signals that may be analyzed to determine the spatial phase of the second-wavelength fringes. Thus, the phase difference between the second-wavelength reference and object beams may be determined.

In variations of the detector configuration shown in FIG. 5, a mixing polarizer may precede a non-polarizing beamsplitter along the optical path, or two separate mixing polarizers may be positioned after a non-polarizing beamsplitter and before the photodetector arrays along their respective optical paths.

Figure 6:
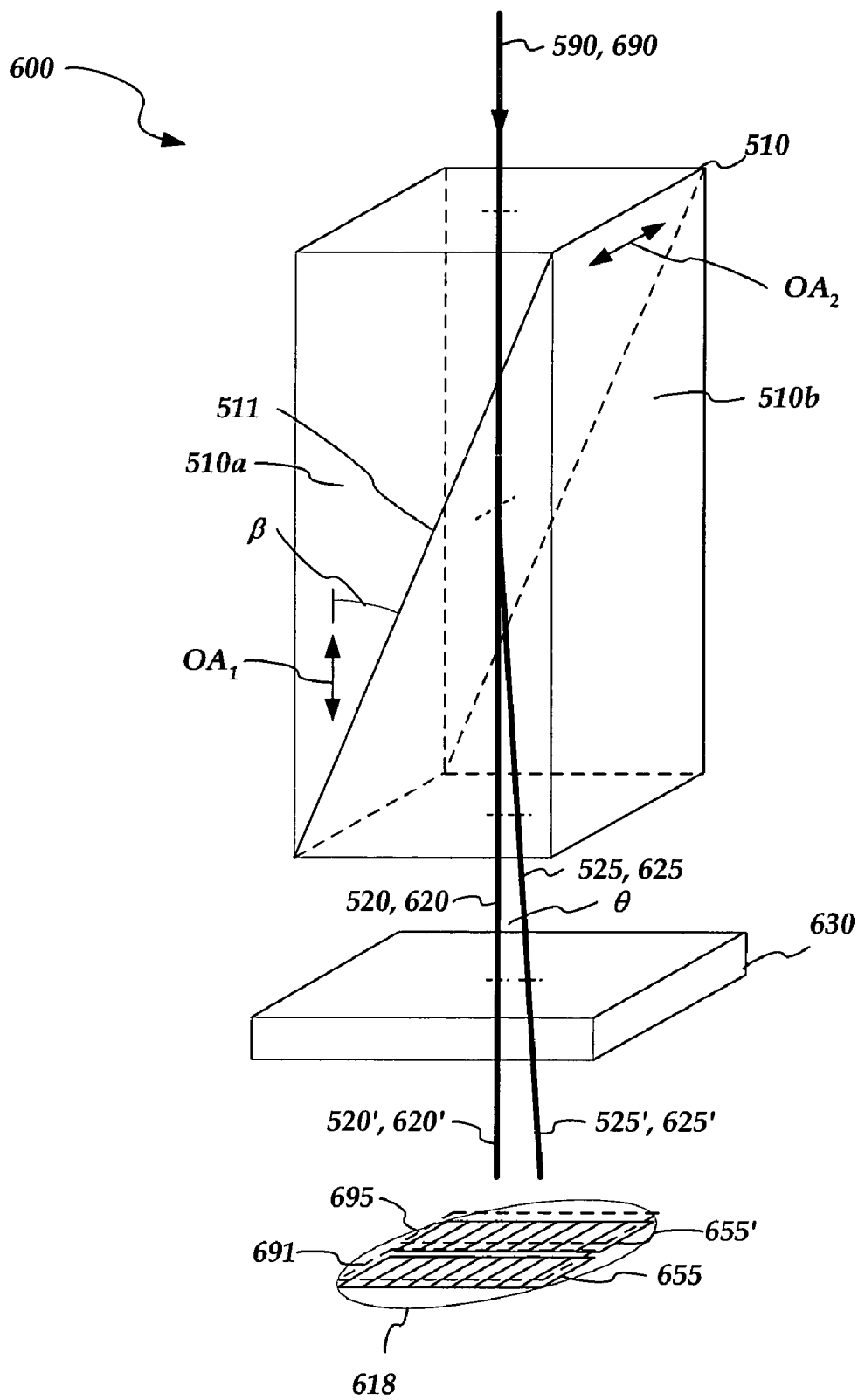
FIG. 6 is a diagram of a second exemplary dual-wavelength detector according to this invention.

FIG. 6 illustrates a second exemplary dual-wavelength detector 600. The detector 600 is shown schematically in FIG. 6. The elements referred to by the reference designations 590 and 690, 510, 520 and 620, 525 and 625, θ, 591', 595', REF and REF', α and α', may be similar or identical to the similarly numbered elements in FIG. 5.

Based on the description of FIG. 5, the structure of the orthogonally polarized beam pairs 520 and 525, 620 and 625, will be understood as they exit the PSBDE 510. These beams enter a mixing polarizer 630, which has a polarization angle that is nominally halfway between the polarization angles of the orthogonally polarized beam pairs 520 and 525, 620 and 625. The first-wavelength components 520' and 525' that are transmitted by the polarizing beamsplitter 575 are similarly polarized, as are the second-wavelength components 620' and 625'. Therefore, they interfere to form a first-wavelength interference pattern and a second-wavelength interference pattern that are superimposed.

A wavelength-sensitive filter 691 (shown schematically by a dashed outline) filters out the second-wavelength radiation and only the first-wavelength fringe pattern reaches the photodetector array 655. The photodetector array 655 is configured and angled to provide signals that may be analyzed to determine the spatial phase of the first-wavelength fringes, according to previously described principles. Similarly, a wavelength-sensitive filter 695 filters out the first-wavelength radiation and only the second-wavelength fringe pattern reaches the photodetector 655'. The photodetector array 655' is configured and angled to provide signals that may be analyzed to determine the spatial phase of the second-wavelength fringes. It is advantageous if the dual-wavelength detector 600 is designed such that the fringe region 618 entirely covers each of the photodetector arrays 655 and 655'. Related design considerations have been described with reference to FIG. 1, and those same considerations are applicable here. Larger beams and larger optical component cross-sections may be used to fulfill this condition, if necessary.

The conventional use for a Rochon prism, is to isolate a plane polarized beam of known orientation from other polarization components in an input light beam. Thus, it is conventionally desirable to provide a fairly large divergence angle to completely separate the desired plane polarized output from the other output beam in a short distance. A conventional use for a Wollaston prism is to determine the extent of polarization in an input beam. The intensities of two output beams are compared to determine the extent of polarization. Thus, it is also conventionally desirable for a Wollaston prism to provide a fairly large divergence angle to completely separate one output from the other output beam in a short distance.

The use of a PSBDE in a detector according to this invention is unconventional. The input beam is known to be orthogonally polarized, and the PSBDE axes are intentionally aligned with those orthogonal polarization directions to preserve the original orthogonal polarizations, yet deflect one or both of the output beams (depending on the type of PSBDE). In addition, a relatively small divergence angle is desired, which is inefficient or useless in conventional applications.

With reference to FIG. 6, the PSBDE 510 may be a Rochon prism. A Rochon prism that is suitable for this unconventional application may comprise two uniaxial crystal prisms 510a and 510b, of the same material, that are optically contacted along an inclined surface 511. The optic axis of the crystal prism 510a is orthogonal to the optic axis of the crystal prism 510b. In one specific example embodiment, quartz is a desirable choice for the uniaxial crystal material because the ordinary and extraordinary refractive indices are relatively close in value, so that the resulting divergence angle θ may be <1° if desired.

As illustrated in FIG. 6, the beam 590 from the interferometer is normal to the entry face of the crystal prism 510a. The optic axis $OA_1$ of the crystal prism 510a is also normal to the entry face. The propagation direction of the beam 590 is parallel to optic axis $OA_1$, so both the S and P polarizations are subject to the same refractive index $n_o$ within the crystal prism 510a. The optic axis $OA_2$ of the crystal prism 510b is perpendicular to optic axis $OA_1$ and parallel to the surface 511. The "cut angle" surface 511 an angle β with optic axis $OA_1$ and is parallel to optic axis $OA_2$. The angle of incidence I of the beam 590 on the surface 511 is $I=\pi/2-\beta$. The P polarization passes through the interface surface 511 without angular deviation since this polarization is orientated along the $n_o$ refractive index in both crystals. Thus the ordinary beam incidence angle is preserved so that it is normal to the entrance and exit faces of the polarizer, forming the beam 520:

The S polarization is oriented along the ordinary refractive index $n_o$ in the first crystal and along the extraordinary refractive index $n_e$ in the second crystal. This results in the S polarization being refracted at an angle R given by:

$$R = \sin^{-1}\left(\frac{n_o \sin(I)}{n_e}\right) \quad \text{(Eq. 6)}$$

The divergence angle θ' between the S and P polarized beams within the prism 510b is:

$$\theta' = I - R \quad \text{(Eq. 7)}$$

The S polarized beam is refracted again at the exit face of the second crystal. The angular divergence θ between the P-polarized beam 520 and the S-polarized beam 525, after the exit refraction is:

$$\theta = \sin^{-1}(n_e \sin(\theta')) \quad \text{(Eq. 8)}$$

Rochon prisms that provide various divergence angles that are compatible with various detector array pitches may be designed based on these relationships. In other PSBDE embodiments, other uniaxial crystal prisms such as a Wollaston prism or a Senarmont prism may be designed and used according to similar principles.

While the preferred embodiment of the invention has been illustrated and described, numerous variations in the illustrated and described arrangements of features and sequences of operations will be apparent to one skilled in the art based The embodiments of the invention in which an exclusive property or privilege is claimed are defined as follows:

1. A method for providing signals indicative of a phase difference between orthogonal, linearly polarized, reference and object beam components that overlap in a combined interferometric measurement beam, the method comprising:
   providing a polarization-sensitive beam-deflecting element having orthogonal first and second polarization-sensitive axes, at least one polarizer, and at least one photodetector array;
   orienting the polarization-sensitive beam-deflecting element such that its first and second polarization-sensitive axes are respectively aligned parallel to the polarizations of the reference and object beams in the combined beam;
   inputting the reference and object beam components of the combined beam into the polarization-sensitive beam-deflecting element;
   outputting the reference and object beam components from the polarization-sensitive beam-deflecting element with a divergence angle between the beam components that is nominally a predetermined divergence angle, and such that the output reference and object beam components are partially overlapping;
   transmitting the partially overlapping reference and object beam components through a polarizer having a transmission axis that nominally bisects the angle between the polarizations of the reference and object beam components, such that the light transmitted by the polarizer forms an interference fringe pattern of nominally parallel fringes characterized by a constant fringe pitch that depends on a wavelength of the reference and object beam components and the divergence angle, and a variable spatial phase that depends on a phase difference between the reference and object beam components; and
   detecting changes in the spatial phase of the interference fringe pattern using a photodetector array that spatially filters the interference fringe pattern and outputs N signals having fixed phase shifts relative to one another, where N is an integer that is at least two,
   wherein a relationship including the values of the N signals is indicative of the phase difference between the reference and object beam components of the combined interferometric measurement beam.

2. The method of claim 1, wherein providing the polarization-sensitive beam-deflecting element comprises providing one of a Rochon prism, a Senarmont prism, a Wollaston prism, and a binary dielectric grating.

3. The method of claim 1, wherein the predetermined divergence angle is at least 0.5 degrees and at most 4.5 degrees.

4. The method of claim 1, wherein detecting changes in the spatial phase of the interference fringe pattern using the photodetector array comprises arranging a periodic photodetector array such that N photodetectors correspond to M times the fringe pitch, where M is an integer that is at least one, and the combination of M and N is a member of the set consisting of (M=1,N=3),(M=1,N=4),(M=2,N=3), and (M=3, N=4).

5. The method of claim 4, wherein M=3 and N=4.

6. The method of claim 4, wherein the photodetectors are arranged at photodetector pitch Pd along a plane of the photodetector array, and arranging the periodic photodetector array such that N photodetectors correspond to M times the fringe pitch comprises arranging the photodetector array in a plane that is rotated about an axis that is parallel to the fringes and approximately perpendicular to the beam paths of the interfering reference and object beam components.

7. The method of claim 1, wherein
   the reference and object beam components that overlap in a combined interferometric measurement beam comprise a first set of reference and object beam components having a first wavelength and a second set of reference and object beam components having a second wavelength, the first and second sets having the same polarization directions and being approximately collinear; and providing at least one photodetector array comprises providing first and second photodetector arrays, and
   the method further comprises:
      providing a first filter that transmits the first wavelength and blocks the second wavelength and a second filter that transmits the second wavelength and blocks the first wavelength;
      passing both sets of reference and object beam components along nominally the same beam path to form a first-wavelength interference fringe pattern comprising light of the first wavelength and second-wavelength interference fringe pattern comprising light of the second wavelength;
      detecting changes in the spatial phase of the first-wavelength interference fringe pattern by locating the first wavelength sensitive filter in front of the first photodetector array, such that the first photodetector array senses only the first-wavelength interference fringe pattern, spatially filtering the first-wavelength interference fringe pattern, and outputting at least two first-detector signals having fixed phase shifts relative to one another, wherein a relationship including the values of the least two first-detector signals is indicative of the phase difference between the reference and object beam components having the first wavelength, and
      detecting changes in the spatial phase of the second-wavelength interference fringe pattern by locating the second wavelength sensitive filter in front of the second photodetector array, such that the second photodetector array senses only the second-wavelength interference fringe pattern, spatially filtering the second-wavelength interference fringe pattern, and outputting at least two second-detector signals having fixed phase shifts relative to one another, wherein a relationship including the values of the least two second-detector signals is indicative of the phase difference between the reference and object beam components having the second wavelength.

8. The method of claim 7, wherein providing at least one polarizer comprises providing a polarizing beamsplitter and transmitting the partially overlapping reference and object beam components through the polarizer comprises transmitting light through the polarizing beamsplitter to form a first interference fringe pattern field, and reflecting light from the polarizing beamsplitter to form a second interference fringe pattern field, wherein and the first wavelength sensitive filter is arranged in front of the first photodetector array in the first interference fringe pattern field, and the second wavelength sensitive filter is arranged in front of the second photodetector array in the second interference fringe pattern field.

9. A detector for providing signals indicative of a phase difference between orthogonal, linearly polarized, reference and object beam components that overlap in a combined interferometric measurement beam, the apparatus comprising:
- a polarization-sensitive beam-deflecting element having orthogonal first and second polarization-sensitive axes that may be oriented such that its first and second polarization-sensitive axes are respectively aligned parallel to the polarizations of received reference and object beams in the combined beam, the polarization-sensitive beam-deflecting element designed to output the received reference and object beams in the combined beam with a divergence angle between the beam components that is nominally a predetermined divergence angle, and such that the output reference and object beam components are partially overlapping;
- at least one polarizer arranged to receive partially overlapping reference and object beam components from the polarization-sensitive beam-deflecting element, and arranged such that its transmission axis nominally bisects the angle between the polarizations of nominally oriented reference and object beam components, such that light transmitted by the polarizer forms an interference fringe pattern of nominally parallel fringes characterized by a constant fringe pitch, and a variable spatial phase that depends on a phase difference between the reference and object beam components; and
- at least one photodetector array arranged to receive the interference fringe pattern, and operable to spatially filter the interference fringe pattern and output N signals having fixed phase shifts relative to one another, where N is an integer that is at least two,
- wherein a relationship including the values of the N signals is indicative of the phase difference between the reference and object beam components of the combined interferometric measurement beam.

10. The detector of claim 9, wherein the polarization-sensitive beam-deflecting element comprises one of a Rochon prism, a Senarmont prism, a Wollaston prism, and a binary dielectric grating.

11. The detector of claim 9, wherein the predetermined divergence angle is at least 0.5 degrees and at most 4.5 degrees.

12. The detector of claim 9, wherein the photodetector array is a periodic photodetector array arranged such that N photodetectors of the array correspond to M times the fringe pitch, where M is an integer that is at least one, and the combination of M and N is a member of the set consisting of (M=1,N=3),(M=1,N=4),(M=2,N=3), and (M=3,N=4).

13. The detector of claim 12, wherein M=3 and N=4.

14. The detector of claim 12, wherein the photodetectors are arranged at photodetector pitch Pd along a plane of the photodetector array, and the photodetector is arranged in a plane that is rotated about an axis that is parallel to nominally expected fringes and approximately perpendicular to nominal beam paths of the interfering reference and object beam components.

15. The detector of claim 9, wherein the at least one photodetector array comprises first and second photodetector arrays, and the detector further comprises:
- a first wavelength sensitive filter arranged in front of the first photodetector array to transmit a first wavelength of light and block a second wavelength of light; and
- a second wavelength sensitive filter is arranged in front of the second photodetector array to block the first wavelength of light and transmit the second wavelength of light,
- wherein, if a first set of reference and object beam components comprising the first wavelength of light and a second set of reference and object beam components comprising the second wavelength of light have the same polarization directions and are approximately collinear they may pass along nominally the same beam path through the detector to form a first-wavelength interference fringe pattern comprising light of the first wavelength and second-wavelength interference fringe pattern comprising light of the second wavelength, and:
  - the combination of the first wavelength filter and the first photodetector array will be operable to sense only the first-wavelength interference fringe pattern, spatially filter the first-wavelength interference fringe pattern, and output at least two first-detector signals having fixed phase shifts relative to one another, wherein a relationship including the values of the least two first-detector signals is indicative of the phase difference between the reference and object beam components having the first wavelength, and
  - the combination of the second-wavelength filter and the second photodetector array will be operable to sense only the second-wavelength interference fringe pattern, spatially filter the second-wavelength interference fringe pattern, and output at least two second-detector signals having fixed phase shifts relative to one another, wherein a relationship including the values of the least two second-detector signals is indicative of the phase difference between the reference and object beam components having the second wavelength.

16. The method of claim 15, wherein the at least one polarizer comprises a polarizing beamsplitter positioned to receive partially overlapping reference and object beam components from the polarization-sensitive beam deflecting element and partially transmit light to form a first interference fringe pattern field, and partially reflect light to form a second interference fringe pattern field, and the first wavelength sensitive filter is arranged in front of the first photodetector array in the first interference fringe pattern field, and the second wavelength sensitive filter is arranged in front of the second photodetector array in the second interference fringe pattern field.

* * * * *

UNITED STATES PATENT AND TRADEMARK OFFICE
CERTIFICATE OF CORRECTION

PATENT NO. : 7,333,214 B2
APPLICATION NO. : 11/396368
DATED : February 19, 2008
INVENTOR(S) : D. W. Sesko It is certified that error appears in the above-identified patent and that said Letters Patent is hereby corrected as shown below:

| COLUMN | LINE | ERROR |
|---|---|---|
| 12 (Equation 8) | 56 | "$\theta = \sin^{-1}(n_c \sin(\theta'))$" should read --$\theta = \sin^{-1}(n_e \sin(\theta'))$-- |
| 16 (Claim 16, line 1) | 46 | "method" should read --detector-- |

Signed and Sealed this

Twenty-first Day of July, 2009

JOHN DOLL
*Acting Director of the United States Patent and Trademark Office*